US006567977B1

(12) United States Patent
Kumar

(10) Patent No.: US 6,567,977 B1
(45) Date of Patent: May 20, 2003

(54) METHOD AND APPARATUS FOR SOFTWARE PROGRAM INSTALLATION PREVIEW DIRECTED TO SYSTEM SOFTWARE

(75) Inventor: Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/440,154

(22) Filed: Nov. 15, 1999

(51) Int. Cl.[7] ............................................. G06F 9/445
(52) U.S. Cl. ..................... 717/174; 717/168; 717/127; 714/2
(58) Field of Search ................. 717/174, 168, 717/120, 121, 157, 169, 172, 177, 132, 127, 128, 138; 714/2

(56) References Cited

U.S. PATENT DOCUMENTS

| | | | | |
|---|---|---|---|---|
| 5,361,359 A | * | 11/1994 | Tajalli et al. ............... | 713/200 |
| 5,490,216 A | * | 2/1996 | Richardson, III ............ | 705/59 |
| 5,555,416 A | * | 9/1996 | Owens et al. ............... | 717/178 |
| 5,617,568 A | * | 4/1997 | Ault et al. .................. | 707/101 |
| 5,815,426 A | * | 9/1998 | Jigour et al. .................. | 365/51 |
| 5,878,384 A | * | 3/1999 | Johnson et al. ............. | 702/187 |
| 6,026,007 A | * | 2/2000 | Jigour et al. .................. | 365/51 |
| 6,047,128 A | * | 4/2000 | Zander ....................... | 717/173 |
| 6,131,192 A | * | 10/2000 | Henry ......................... | 717/175 |
| 6,161,218 A | * | 12/2000 | Taylor ......................... | 717/174 |
| 6,175,517 B1 | * | 1/2001 | Jigour et al. .................. | 365/63 |
| 6,199,202 B1 | * | 3/2001 | Coutant et al. ............. | 717/138 |
| 6,260,057 B1 | * | 7/2001 | Eykholt et al. ............. | 709/102 |
| 6,385,770 B1 | * | 5/2002 | Sinander ..................... | 717/170 |
| 6,496,977 B1 | * | 12/2002 | Hamilton, II et al. ...... | 717/168 |

OTHER PUBLICATIONS

Parnas et al. "Response to undesires events", ACM Pro. Int. Conf. on Soft. Eng. Oct. 1976.*

* cited by examiner

Primary Examiner—Anil Khatri
(74) Attorney, Agent, or Firm—Blakely, Sokoloff, Taylor & Zafman LLP

(57) ABSTRACT

A method includes trapping function calls that if executed would modify the configuration of a computer system. The functionality of the trapped function calls is emulated such that the configuration is not modified.

19 Claims, 2 Drawing Sheets

METHOD AND APPARATUS FOR SOFTWARE PROGRAM INSTALLATION PREVIEW DIRECTED TO SYSTEM SOFTWARE

BACKGROUND

1. Field

The invention relates to software installation and, more particularly, to reducing problems in computer system operation related to software installation.

2. Background Information

A software program typically includes a sequence of instructions stored in a memory and executed by a processor. As used herein, the term "program" may refer to any form of packaging (that is, organizing and grouping) sequences of software instructions. The term "program" may refer to executable programs, statically-linked libraries, dynamically-linked libraries, applets, and many other forms of packaging and organization for software sequences well known in the art.

An installation program is a program which installs another program on a computer system. A computer system may be any device comprising a processor to execute instructions and a memory to store the instructions. In a computer system, instructions in the memory are typically supplied to the processor by way of a bus. The installation of a program may involve numerous tasks. For example, installation may involve altering or adding to configuration files of the computer system, including files that configure the operating system. Herein, the term "operating system" refers to a sequence of instructions which, when executed by the processor, manages computer system resources. Computer system resources include memory and input/output (I/O) ports.

In addition to modifying configuration files, an installation program may alter or add settings with a central data store for the computer system. On computer systems running the Microsoft Windows™ operating system, the central data store is called the Registry. The installation program may also copy, move, and overwrite files on the computer system.

Alterations to a computer system caused by an installation program may create operational problems for the operating system or other installed programs. For example, the installation of a program designed to cooperate with previously installed programs may result in modifications to the settings for the previously installed program. These setting modifications may cause the previously installed program to operate in abnormal ways. The installation program may copy over or move files on the computer system mass storage device (such as a hard disk). These files may be used by previously installed programs or the operating system. Overwriting or moving them may result in abnormal operation of the programs. In the worst case, the previously installed program or operating system may cease to operate altogether or may operate in a destructive fashion.

On some computer systems, it may be possible to execute an uninstall program to undo some of the effects of installation. However, it may not be possible to undo all of the effects of installing a program. For example, if the installation program overwrote a file used by another program, is may not be possible to recover the overwritten file. Backup copies may be kept of overwritten files, but making and keeping backup copies may be time consuming and may consume space on the computer system's storage device.

A need therefor exists for a manner of installing programs which enables the effects of the installation to be observed and analyzed before causing actual alterations to the computer system configuration.

IN THE DRAWINGS

FIGS. 2 and 3 have been amended and are enclosed with a Transmittal of Amended Drawings cover sheet.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

In accordance with one embodiment of the present invention, an installation program is executed under the control of a shell program. A shell program is a program which may implement or trap function calls which the installation program invokes to perform the installation process. Herein, "function calls" refer to transfer of execution control from the sequence of instructions comprising the installation program to another sequence of instructions to perform a specific task. For example, the installation program may invoke function calls to the operating system to copy or move files or to add or alter system settings (in a Windows environment, system settings are stored in a data structure called the Registry). The shell program may intercept these function calls to the operating system and emulate the functionality of the functions, without making actual modifications to the computer system configuration.

Figure 1:
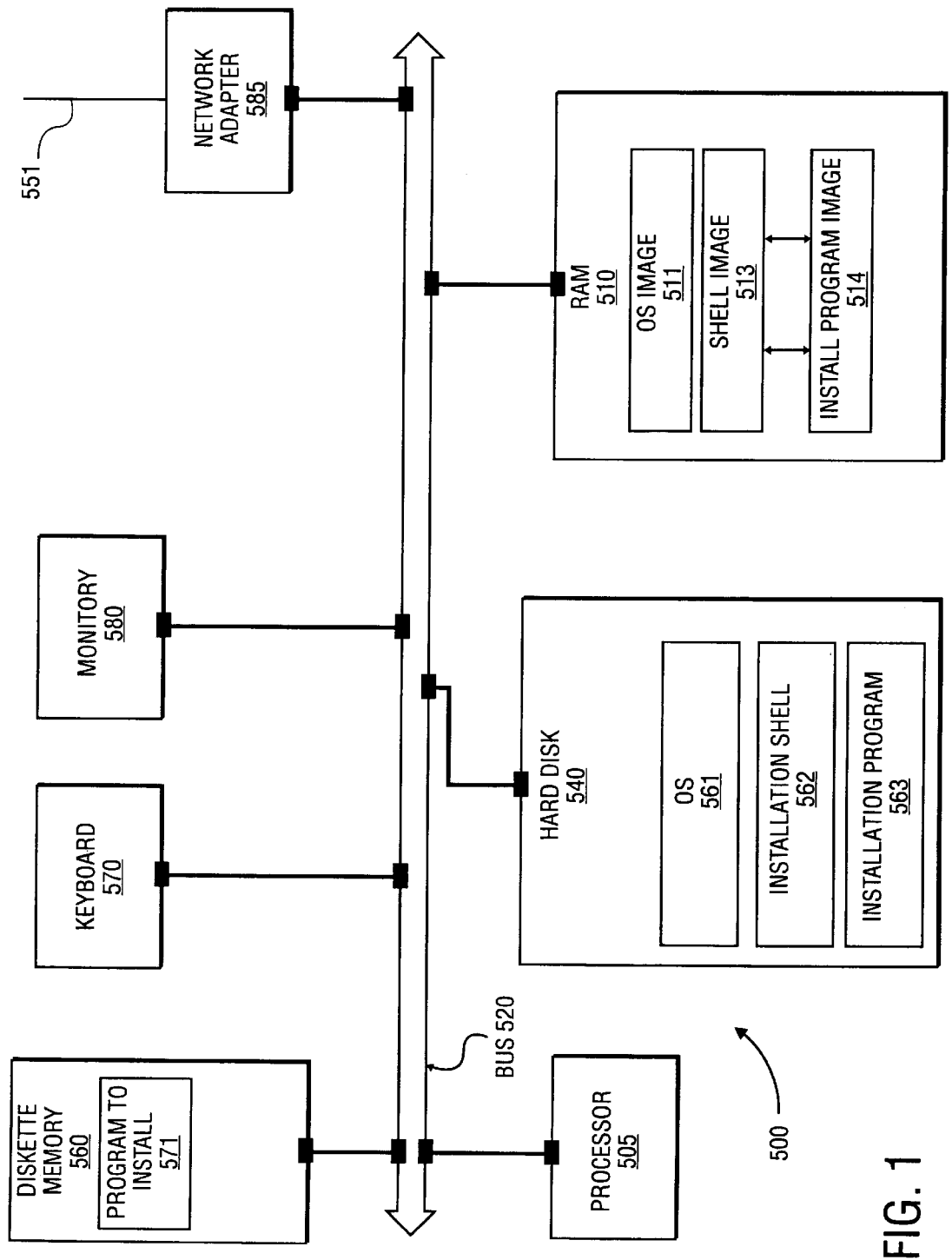
FIG. 1 is a block diagram illustrating one embodiment of a computer system in accordance with the present invention.

FIG. 1 shows an embodiment 500 of a computer system in accordance with the present invention. Embodiment 500 comprises a processor 505 to execute instructions supplied from a bus 520. The executed instructions are stored in a memory 510 from which they are supplied to the processor 505 by the bus 520 for execution. The processor 505 may be implemented using any semiconductor fabrication technology and may execute any instruction set including, but not limited to, instruction sets supported by an Intel Corporation Pentium® processor or compatible processor. Multiple processors may also be present in the system 500. The bus 520 may be implemented using technologies for propagating signals including, but not limited to, electronic and optical conductors and may in fact comprise multiple busses. The memory 510 may include random access memory (RAM), read-only memory (ROM), or any other form of memory capable of storing instructions which may then be supplied to the processor 505 by the bus 520 for execution. Embodiment 500 may include a machine-readable storage medium 540 to store sequences of instructions which may be loaded into memory 510 from which they may be supplied to processor 505 for execution. The machine-readable storage medium 540 may include, but is not limited to, a hard drive, a floppy drive, and a CD-ROM or other optical disk.

One skilled in the art will appreciate that in "diskless" devices without mass storage mediums, the machine-readable storage medium 540 may be omitted from the embodiment 500. Instructions may then be stored in RAM, ROM, or other memory from which instructions may be directly accessed over the bus 520 by the processor 505 for execution.

To perform signal input/output, embodiment 500 may comprise a keyboard 570 and a display 580, each coupled to the bus 520. Of course, other peripheral devices may be present as well. The embodiment 500 may further include a network adapter 585 to couple the embodiment 500 to a network by way of an external channel, such as a network cable or wireless link. Of course, the invention is not limited in scope to this particular embodiment.

In accordance with the present invention, embodiment 500 may comprise a operating system 561, an installation shell program 562, and an installation program 563 stored on the machine-readable storage medium 540. In manners well known in the art, these programs may be loaded into memory 510 to create an OS memory image 511, shell image 513, and install program image 514 suitable for execution by processor 505. A program to install 571 may be stored, in one embodiment, in a diskette memory 560 which is removable from the system 500. The program to install 571 may be supplied to the system in numerous other ways as well, including by dowloading the program 571 through the network channel 551 to memory 510, on CD-ROM, or in numerous other manners well known in the art.

In one embodiment the shell image 513 is executed by the processor 505 and causes the install program image 514 to be loaded into memory. The install program image 514, in turn, may then be executed and may begin calling functions of the OS image 511 to install the program 571 from the diskette 560. The shell image 513 may be configured to trap these function calls from the install program image 514 to the OS image 511 and emulate their functionality.

Figure 2:
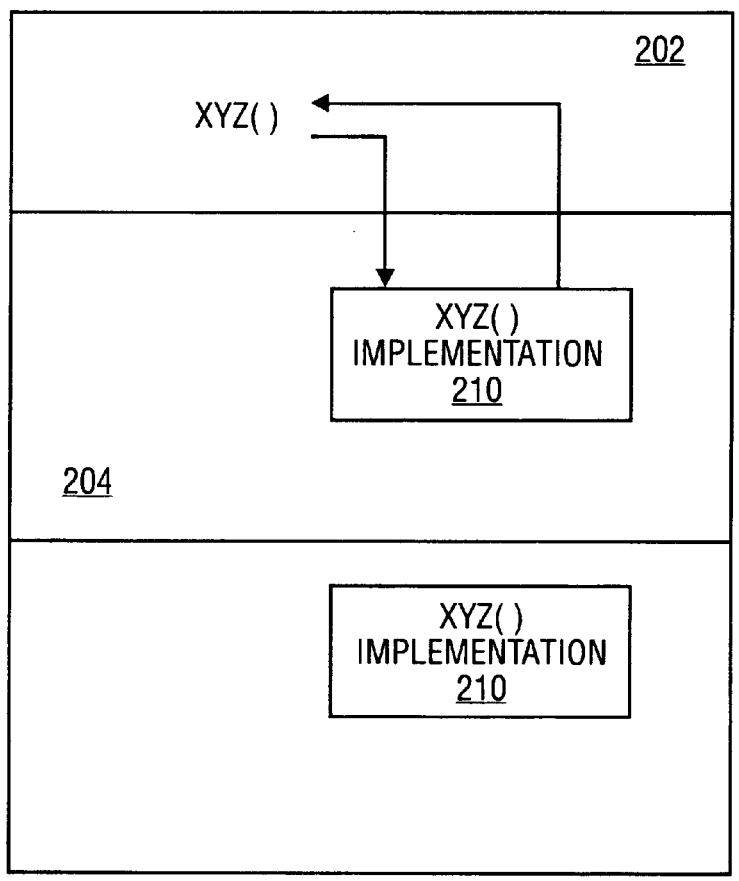
FIG. 2 is a illustration of one embodiment of how function calls are trapped.

Install program 563 need not be specifically configured to cooperate with shell program 562. Instead, shell program 562, when executed, intervenes between install program 563 and operating system 561 to trap function calls from install program 563 to operating system. The manners in which a program may intervene to trap function calls to another program are well known in the art, and may vary according to the operating system of the system. FIG. 2 illustrates the general concept of function trapping. A first program 202 issues a function call XYZ( ) which normally invokes a first implementation of function XYZ( ) in second program 206. However, third program 204 intervenes with a second implementation 210 of function call XYZ( ). Control eventually returns to first program 202 after second implementation 210 of function call XYZ( ) completes.

The shell program 562 may be designed to trap a large percentage of the function calls which install program 563 will typically issue during the installation process. For example, function calls to copy, rename, uncompress, or move files may be trapped. Function calls to modify system configuration settings, such as Registry settings on Windows systems, may also be trapped. Furthermore, the shell 562 emulates, from the caller's point of view, all of the functionality of the trapped functions. Thus the shell 562 returns the same values and information as the OS functions which it traps, without making actual modifications to system configuration as the OS functions do.

Figure 3:
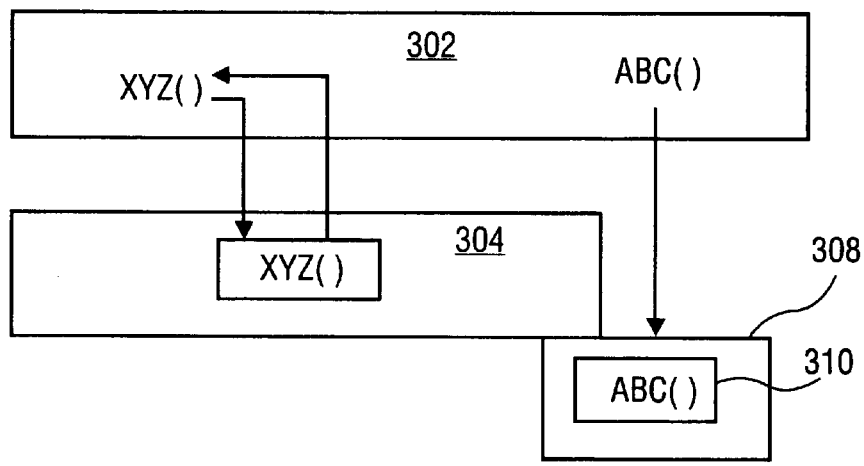
FIG. 3 is an illustration of one embodiment of extending a shell program with a plug-in module.

As previously described, shell program 562 may be designed to trap a large percentage of the function calls which install program 563 will typically issue during the installation process. In one embodiment shell program 562 may be extended to trap additional function calls using well known methods, such as "plug-in" modules. Herein the term "plug-in" modules is used generally to refer to any technique of associating additional instruction sequences with the shell program. Many techniques are well known in the art, such as the use of filter modules, extension modules, and script files. As FIG. 3 illustrates, the shell program 304 may not be configured to trap a function call ABC( ) which is not typically invoked by installation program 302 (perhaps because the designers of the shell program 304 did not envision any installation program calling this particular function). A plug-in module 310 may be provided which enhances the functionality of shell program 304 to trap function ABC( ) and provide an implementation 308 of function ABC( ) to installation program 302. In one embodiment the plug-in module 310 may be provided by those parties which provide the installation program 302.

In one embodiment, the shell program 562 makes recordings in a log file indicating the changes in system configuration which would have made by the install program 563 if the function calls of the install program 563 were not trapped. The log file can take many forms, including a data file stored on the computer system 500, a log in memory 510, or a printout on a printer (not shown) to name a few possibilities. The log file may be inspected and analyzed to determine whether the changes to system configuration, if allowed to occur, would create undesirable system behavior. If no undesirable behavior is likely to occur, the install program 563 may be again executed, without the intervention of the shell program 562, to actually install program 571 and modify system configuration.

In general, the shell program 562 may perform operations of the trapped functions which produce transient results (updates to the system display, reading files, computation of state variables and data values, etc.) without performing operations that modify the persistent state of the computer system (writing, moving, or copying files, for example).

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

trapping function calls that if executed would modify the configuration of a computer system;

emulating the functionality of the trapped function calls such that the configuration is not modified, the emulating includes returning values generated by the trapped function calls.

2. The method of claim 1, wherein the function calls are made by an installation program.

3. The method of claim 1, wherein a log identifies changes to the configuration of the computer system which would have occurred if the function calls were executed.

4. The method of claim 1, wherein the function calls are trapped by a shell program.

5. The method of claim 4, wherein the shell program is configured to be extended with a plug-in module to trap additional function calls.

6. A method comprising:

executing a shell program;

the shell program loading an installation program and trapping function calls by the installation program that if executed would modify the configuration of a computer system; and the shell program emulating the functionality of the trapped function such that the configuration is not modified, the emulating includes returning values generated by the trapped function.

7. The method of claim 6, wherein a log identifies changes to the configuration of the computer system which would have occurred if the function calls were not trapped.

8. The method of claim 6, wherein the shell program is configured to be extended with a plug-in module to trap additional function calls.

9. An article comprising:

a machine-readable medium having stored thereon a sequence of instructions which, when executed by a data processing device, cause the data processing device to:

trap function calls that modify the configuration of a computer system; and emulate the functionality of the trapped function calls without modifying the configuration, the emulation includes returning values generated by the trapped function calls.

10. The article of claim 9, wherein the sequence of instructions, when executed by the data processing device, further cause the data processing device to trap function calls made by an installation program.

11. The article of claim 9, wherein the sequence of instructions, when executed by the data processing device, further cause the data processing device to keep a log identifying changes to the configuration of the computer system which would have occurred if the function calls were not trapped.

12. The article of claim 9, wherein the sequence of instructions comprises a shell program.

13. The article of claim 12, wherein the shell program is configured to be extended with a plug-in module to trap additional function calls.

14. A device comprising:

a processor;

a machine-readable storage medium coupled to the processor by way of a bus, the storage medium storing a sequence of instructions which, when executed by the processor, cause the device to trap function calls that modify the configuration of a computer system; and emulate the functionality of the trapped function calls without modifying the configuration, the emulation includes returning values generated by the trapped function calls.

15. The device of claim 14, wherein the sequence of instructions, when executed by the data processing device, further cause the data processing device to trap function calls made by an installation program.

16. The device of claim 15, wherein the sequence of instructions, when executed by the data processing device, further cause the data processing device to keep a log identifying changes to the configuration of the computer system which would have occurred if the function calls were not trapped.

17. The device of claim 15, wherein the sequence of instructions comprises a shell program.

18. The device of claim 17, wherein the shell program is configured to be extended with a plug-in module to trap additional function calls.

19. A method comprising:

trapping selected function calls; and performing operations that produce substantially the same transient results as the function calls such that the persistent state of a computer system is not changed.

* * * * *